US010028226B2

United States Patent
Ayyagari et al.

(10) Patent No.: US 10,028,226 B2
(45) Date of Patent: *Jul. 17, 2018

(54) EFFICIENT USAGE OF INTERNET SERVICES ON MOBILE DEVICES

(71) Applicant: International Business Machines Corporation, Armonk, NY (US)

(72) Inventors: Phani Kumar V. U. Ayyagari, Hyderabad (IN); Manish A. Bhide, Hyderabad (IN); Purnachandra R. Jasti, Hyderabad (IN)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/149,566

(22) Filed: May 9, 2016

(65) Prior Publication Data
US 2017/0064631 A1    Mar. 2, 2017

Related U.S. Application Data

(63) Continuation of application No. 14/835,800, filed on Aug. 26, 2015.

(51) Int. Cl.
*H04L 29/08* (2006.01)
*H04W 52/02* (2009.01)

(52) U.S. Cl.
CPC ......... *H04W 52/0251* (2013.01); *H04L 67/10* (2013.01); *H04W 52/0264* (2013.01); *H04W 52/0274* (2013.01); *Y02B 60/50* (2013.01)

(58) Field of Classification Search
CPC ............. H04L 12/2803; H04L 12/2805; H04L 12/2807; H04L 12/2809; H04L 12/281;
(Continued)

(56) References Cited

U.S. PATENT DOCUMENTS 6,502,022 B1* 12/2002 Chastain ................ G01C 21/26
701/36
6,654,895 B1* 11/2003 Henkhaus ............. G06F 1/3203
710/18
(Continued)

FOREIGN PATENT DOCUMENTS

EP        2171929 A1 *  4/2010 ............. H04L 45/26
WO  WO 2009006188 A1 *  1/2009 ............. H04L 45/26
WO     2010036885 A3    4/2010

OTHER PUBLICATIONS

Ayyagari et al., "Efficient Usage of Internet Services on Mobile Devices", U.S. Appl. No. 14/835,800, filed Aug. 26, 2015, 25 pages.
(Continued)

*Primary Examiner* — Eric Nowlin
(74) *Attorney, Agent, or Firm* — David B. Woycechowsky

(57) ABSTRACT

Communications systems including multiple computer devices where: (i) for a set of computer devices, used by a common user, it is determined which computer device the user is most actively using; and (ii) an operational mode of a "wireless service" (see definition, below) on one of the other computer devices (that is, a non-most-active computer device) is changed in its operational mode. For example, if a user has two smart phones and the user's first smart phone is determined to be more active than the second smart phone, then on the second smart phone (that is, the non-most-active computer device) a social media home page updating service is turned off. In some embodiments, the change from first operational mode to second operational mode will mean that wireless transceiver hardware (such as an antenna) is turned off for the non-most-active device(s).

6 Claims, 2 Drawing Sheets

(58) Field of Classification Search
CPC ............. H04L 12/2812; H04L 12/2814; H04L 12/2816; H04L 12/2818; H04L 12/282; H04L 12/2823; H04L 12/2825; H04L 12/2827; H04L 12/2829; H04L 12/2838; H04L 67/10; H04L 67/104; H04L 67/12; H04W 4/005; H04W 4/008; H04W 8/20; H04W 52/0251; H04W 24/10; H04W 40/02; H04W 52/0261; H04W 84/12; G06F 1/329; G06F 1/3246; H04N 1/00891; Y02B 60/34; Y02B 60/50
See application file for complete search history.

(56) References Cited

U.S. PATENT DOCUMENTS

| | | | | |
|---|---|---|---|---|
| 6,771,946 | B1* | 8/2004 | Oyaski | H04M 1/6075 340/936 |
| 7,191,349 | B2* | 3/2007 | Kaushik | G06F 1/3203 712/E9.053 |
| 7,295,827 | B2* | 11/2007 | Liu | G06F 1/3209 340/7.34 |
| 7,668,146 | B2* | 2/2010 | Levendel | H04W 40/24 370/338 |
| 8,014,329 | B2* | 9/2011 | Gong | H04L 45/26 340/7.33 |
| 8,051,319 | B2* | 11/2011 | Huang | G06F 1/3203 713/300 |
| 8,276,010 | B2* | 9/2012 | Vavilala | G06F 1/3203 709/233 |
| 8,395,518 | B2* | 3/2013 | Toba | H04M 1/73 307/10.7 |
| 8,462,806 | B2* | 6/2013 | Seok | H04W 40/26 370/428 |
| 8,644,396 | B2* | 2/2014 | Lee | H03F 3/217 375/259 |
| 8,767,771 | B1* | 7/2014 | Shukla | H04W 52/0216 370/238 |
| 8,886,261 | B2* | 11/2014 | Aerrabotu | H04B 1/406 455/343.5 |
| 8,934,947 | B2* | 1/2015 | Aerrabotu | H04B 1/406 455/343.5 |
| 9,036,489 | B2* | 5/2015 | Huseth | H04W 52/0206 370/244 |
| 9,137,628 | B2* | 9/2015 | Gao | H04W 4/008 |
| 9,152,195 | B2* | 10/2015 | Cheston | G06F 1/26 |
| 9,229,515 | B2* | 1/2016 | Chang | G06F 1/28 |
| 9,247,410 | B1* | 1/2016 | Matsuo | H04W 52/0212 |
| 9,247,502 | B2* | 1/2016 | Xie | H04W 52/0261 |
| 9,294,997 | B1* | 3/2016 | Shukla | H04W 52/0216 |
| 9,301,252 | B2* | 3/2016 | Narasimha | H04W 52/0212 |
| 9,301,256 | B2* | 3/2016 | Mohan | H04W 52/0229 |
| 9,402,149 | B2* | 7/2016 | Son | H04B 7/24 |
| 9,451,653 | B2* | 9/2016 | Davies | H04W 52/0261 |
| 9,459,682 | B2* | 10/2016 | Rajkotia | H04L 12/12 |
| 9,503,975 | B2* | 11/2016 | Shalunov | H04W 52/0212 |
| 9,515,701 | B2* | 12/2016 | Rizzo | G06K 7/0008 |
| 9,516,522 | B1* | 12/2016 | Hewitt | H04W 24/02 |
| 9,565,518 | B2* | 2/2017 | Terrazas | H04W 4/02 |
| 9,596,603 | B2* | 3/2017 | Spencer | H04W 48/12 |
| 9,681,381 | B2* | 6/2017 | Kang | H04W 52/0229 |
| 9,693,311 | B2* | 6/2017 | Cardozo | H04W 52/0258 |
| 9,723,154 | B2* | 8/2017 | Damstra | H04M 15/60 |
| 9,729,340 | B2* | 8/2017 | Britt | H04L 12/2807 |
| 9,774,497 | B2* | 9/2017 | Britt | H04L 41/0803 |
| 9,774,507 | B2* | 9/2017 | Britt | H04L 43/04 |
| 9,780,823 | B2* | 10/2017 | Egner | H04B 1/385 |
| 9,819,821 | B2* | 11/2017 | Nakayama | H04N 1/00891 |
| 9,820,225 | B2* | 11/2017 | Ang | H04W 52/0212 |
| 9,826,483 | B2* | 11/2017 | Park | H04W 52/0229 |
| 2004/0128563 | A1* | 7/2004 | Kaushik | G06F 1/3203 713/300 |
| 2004/0209594 | A1* | 10/2004 | Naboulsi | G08B 21/06 455/404.1 |
| 2006/0253735 | A1* | 11/2006 | Kwak | G06F 1/3203 714/12 |
| 2007/0129045 | A1* | 6/2007 | Aerrabotu | H04B 1/406 455/343.5 |
| 2007/0263647 | A1* | 11/2007 | Shorty | H04L 12/10 370/406 |
| 2008/0005599 | A1* | 1/2008 | Theocharous | G06F 1/3203 713/300 |
| 2009/0009475 | A1* | 1/2009 | Schuette | G06F 1/263 345/163 |
| 2009/0010190 | A1* | 1/2009 | Gong | H04L 45/26 370/311 |
| 2009/0254765 | A1* | 10/2009 | Huang | G06F 1/3203 713/300 |
| 2009/0300380 | A1* | 12/2009 | Vojak | G06F 1/3228 713/310 |
| 2010/0100716 | A1* | 4/2010 | Scott | G06F 1/3209 713/1 |
| 2010/0145884 | A1* | 6/2010 | Paik | G06Q 50/06 705/412 |
| 2010/0157827 | A1* | 6/2010 | Park | H04L 43/0852 370/252 |
| 2010/0259400 | A1* | 10/2010 | Toba | H04M 1/73 340/636.1 |
| 2011/0164512 | A1* | 7/2011 | Citrano, III | H04W 8/22 370/252 |
| 2012/0330475 | A1* | 12/2012 | Chen | G06F 1/263 700/292 |
| 2013/0019019 | A1* | 1/2013 | Lam | H04L 67/34 709/226 |
| 2013/0026947 | A1* | 1/2013 | Economy | H05B 37/0272 315/287 |
| 2013/0281154 | A1* | 10/2013 | Aerrabotu | H04B 1/406 455/553.1 |
| 2013/0343202 | A1* | 12/2013 | Huseth | H04W 52/0206 370/244 |
| 2014/0024416 | A1* | 1/2014 | Xie | H04W 52/0261 455/574 |
| 2014/0047254 | A1* | 2/2014 | Ha | H04W 52/0235 713/323 |
| 2014/0085084 | A1* | 3/2014 | Ghazarian | H04W 4/023 340/539.13 |
| 2014/0095617 | A1 | 4/2014 | Chan et al. | |
| 2014/0095660 | A1 | 4/2014 | Chan | |
| 2014/0099614 | A1* | 4/2014 | Hu | G09B 19/00 434/236 |
| 2014/0128021 | A1 | 5/2014 | Walker et al. | |
| 2014/0133379 | A1* | 5/2014 | Wang | H04W 24/02 370/311 |
| 2014/0136380 | A1* | 5/2014 | Chang | G06F 1/28 705/35 |
| 2014/0161118 | A1* | 6/2014 | Iyer | H04W 52/0216 370/351 |
| 2014/0173304 | A1* | 6/2014 | Rahman | H04L 12/6418 713/310 |
| 2014/0220933 | A1 | 8/2014 | Lynes et al. | |
| 2014/0274023 | A1* | 9/2014 | Rajeevalochana | H04W 4/027 455/418 |
| 2014/0351800 | A1* | 11/2014 | Jao | G06F 8/41 717/140 |
| 2015/0029880 | A1* | 1/2015 | Burns | H04W 84/00 370/252 |
| 2015/0042484 | A1* | 2/2015 | Bansal | G06F 1/3212 340/693.3 |
| 2015/0050925 | A1* | 2/2015 | Tapia | H04W 24/04 455/418 |
| 2015/0099505 | A1* | 4/2015 | Kiukkonen | H04M 1/7253 455/419 |
| 2015/0130276 | A1* | 5/2015 | McNeill-McCallum | H02J 3/00 307/23 |
| 2015/0131502 | A1* | 5/2015 | Narasimha | H04W 52/0212 370/311 |
| 2015/0161835 | A1* | 6/2015 | Jablokov | G07C 9/00111 340/5.61 |
| 2015/0172848 | A1* | 6/2015 | Gao | H04W 4/008 455/41.3 |

(56) References Cited

U.S. PATENT DOCUMENTS

| | | | |
|---|---|---|---|
| 2015/0181524 A1* | 6/2015 | Hillyard | H04W 52/0251 370/311 |
| 2015/0195857 A1* | 7/2015 | Pan | H04W 4/008 455/41.3 |
| 2015/0229782 A1* | 8/2015 | Zuidema | H04W 4/008 455/418 |
| 2015/0230172 A1* | 8/2015 | Shalunov | H04W 52/0212 370/311 |
| 2015/0289088 A1* | 10/2015 | Terrazas | H04W 4/02 455/404.2 |
| 2015/0304800 A1* | 10/2015 | Son | H04B 7/24 455/41.2 |
| 2015/0358777 A1* | 12/2015 | Gupta | H04L 12/2807 370/254 |
| 2016/0007288 A1* | 1/2016 | Samardzija | H04W 52/0229 370/311 |
| 2016/0029316 A1* | 1/2016 | Mohan | H04W 52/0229 455/417 |
| 2016/0044742 A1* | 2/2016 | Davies | H04W 52/0261 370/311 |
| 2016/0048827 A1* | 2/2016 | Corbalis | G06Q 20/3278 705/71 |
| 2016/0062440 A1* | 3/2016 | Gelonese | G06F 1/3209 713/323 |
| 2016/0070244 A1* | 3/2016 | Cipollo | G05B 15/02 700/275 |
| 2016/0070287 A1* | 3/2016 | Chin | G05F 1/66 700/297 |
| 2016/0070718 A1* | 3/2016 | Lee | H04L 12/2803 707/610 |
| 2016/0073351 A1* | 3/2016 | Cardozo | H04W 52/0258 455/574 |
| 2016/0073482 A1* | 3/2016 | Fok | H04L 12/282 315/294 |
| 2016/0075034 A1* | 3/2016 | Laurent | H04L 12/282 700/264 |
| 2016/0088563 A1* | 3/2016 | Koo | H04W 52/0251 455/566 |
| 2016/0095057 A1* | 3/2016 | Guy | H04W 52/0219 709/224 |
| 2016/0098997 A1* | 4/2016 | Ding | G10L 17/22 704/275 |
| 2016/0150350 A1* | 5/2016 | Ingale | H04L 67/12 370/255 |
| 2016/0164748 A1* | 6/2016 | Kim | G06N 5/046 706/47 |
| 2016/0165538 A1* | 6/2016 | Matsuo | H04W 52/0212 455/404.1 |
| 2016/0195856 A1* | 7/2016 | Spero | G06N 5/046 700/90 |
| 2016/0241445 A1* | 8/2016 | Kim | H04L 67/10 |
| 2016/0277879 A1* | 9/2016 | Daoura | H04W 4/008 |
| 2016/0349813 A1* | 12/2016 | DiSessa | G06F 1/26 |
| 2016/0352673 A1* | 12/2016 | Flores | H04L 67/306 |
| 2016/0353386 A1* | 12/2016 | Sasidharan | H04W 52/0264 |
| 2017/0013558 A1* | 1/2017 | Li | G01R 31/362 |
| 2017/0024993 A1* | 1/2017 | Lee | H04L 67/12 |
| 2017/0041856 A1* | 2/2017 | Kim | H04W 4/023 |
| 2017/0048797 A1* | 2/2017 | Choi | H04W 52/0229 |
| 2017/0083312 A1* | 3/2017 | Pindado | G06F 8/77 |
| 2017/0157511 A1* | 6/2017 | Feghali | A63F 13/323 |
| 2017/0162007 A1* | 6/2017 | Boyd | G08B 5/36 |
| 2017/0164237 A1* | 6/2017 | Mahmoodi | H04W 28/08 |
| 2017/0169640 A1* | 6/2017 | Britt | G07C 9/00309 |
| 2017/0171204 A1* | 6/2017 | Forood | H04W 4/005 |
| 2017/0171518 A1* | 6/2017 | Modestine | H04N 5/23206 |
| 2017/0199559 A1* | 7/2017 | Bengualid | G06F 1/329 |
| 2017/0235357 A1* | 8/2017 | Leung | G06F 1/3212 |
| 2017/0257129 A1* | 9/2017 | Egner | H04B 1/385 |
| 2017/0272897 A1* | 9/2017 | Dikeman | H04L 45/24 |
| 2017/0280435 A1* | 9/2017 | Egner | H04W 72/048 |
| 2017/0289738 A1* | 10/2017 | Jepson | A61B 5/1118 |
| 2017/0303203 A1* | 10/2017 | Haro | H04W 52/0274 |
| 2017/0325170 A1* | 11/2017 | Alshinnawi | H04W 52/0251 |
| 2017/0332330 A1* | 11/2017 | Dhandu | H04W 52/0258 |
| 2017/0339642 A1* | 11/2017 | Bakker | H04W 52/0229 |
| 2017/0339663 A1* | 11/2017 | Peterson | H04W 68/005 |
| 2017/0343354 A1* | 11/2017 | Chelian | G01C 21/165 |

OTHER PUBLICATIONS

Appendix P—List of IBM Patents and Patent Applications Treated as Related, 2 pages.

* cited by examiner

EFFICIENT USAGE OF INTERNET SERVICES ON MOBILE DEVICES

BACKGROUND

The present invention relates generally to the use of "wireless services" (see definition, below, in Definitions sub-section of the Detailed Description section), such as "internet services" (see definition, below, in Definitions sub-section of the Detailed Description section) by "computer devices" (see definition of "computer", below, in Definitions sub-section of the Detailed Description section), and situations where a single individual person uses wireless services on more than one computer device, in a series manner and/or at the same time.

Many computer devices are mobile because they include a built-in power source (typically a battery) and the ability to communicate wirelessly with the internet. It is known that wireless communication, with a mobile battery-powered device contributes to battery drain in the mobile computer device. It is further understood that a greater number of running internet services leads to faster draining of the battery of the battery-powered mobile computer device, and, accordingly, a necessity to recharge the battery of the battery-powered mobile computer device sooner relative to a situation where fewer internet services were running on the battery-powered mobile computer device.

SUMMARY

According to an aspect of the present invention, there is a method, computer program product and/or system for use with a plurality of computer devices including a first computer device running a first wireless service and a second computer device that performs the following operations (not necessarily in the following order): (i) receiving first activity level information corresponding to a level of a user's activity on the first computer device; (ii) receiving second activity level information corresponding to a level of the user's activity on the second computer device; (iii) determining which device of the plurality of computer devices is the most active based, at least in part, upon the first activity level information and the second activity level information; and/or (iv) on condition that the second computer device is determined to be the most active, sending a command to change an operational mode of the first wireless service from a first operational mode to a second operational mode.

DETAILED DESCRIPTION

Figure 1:
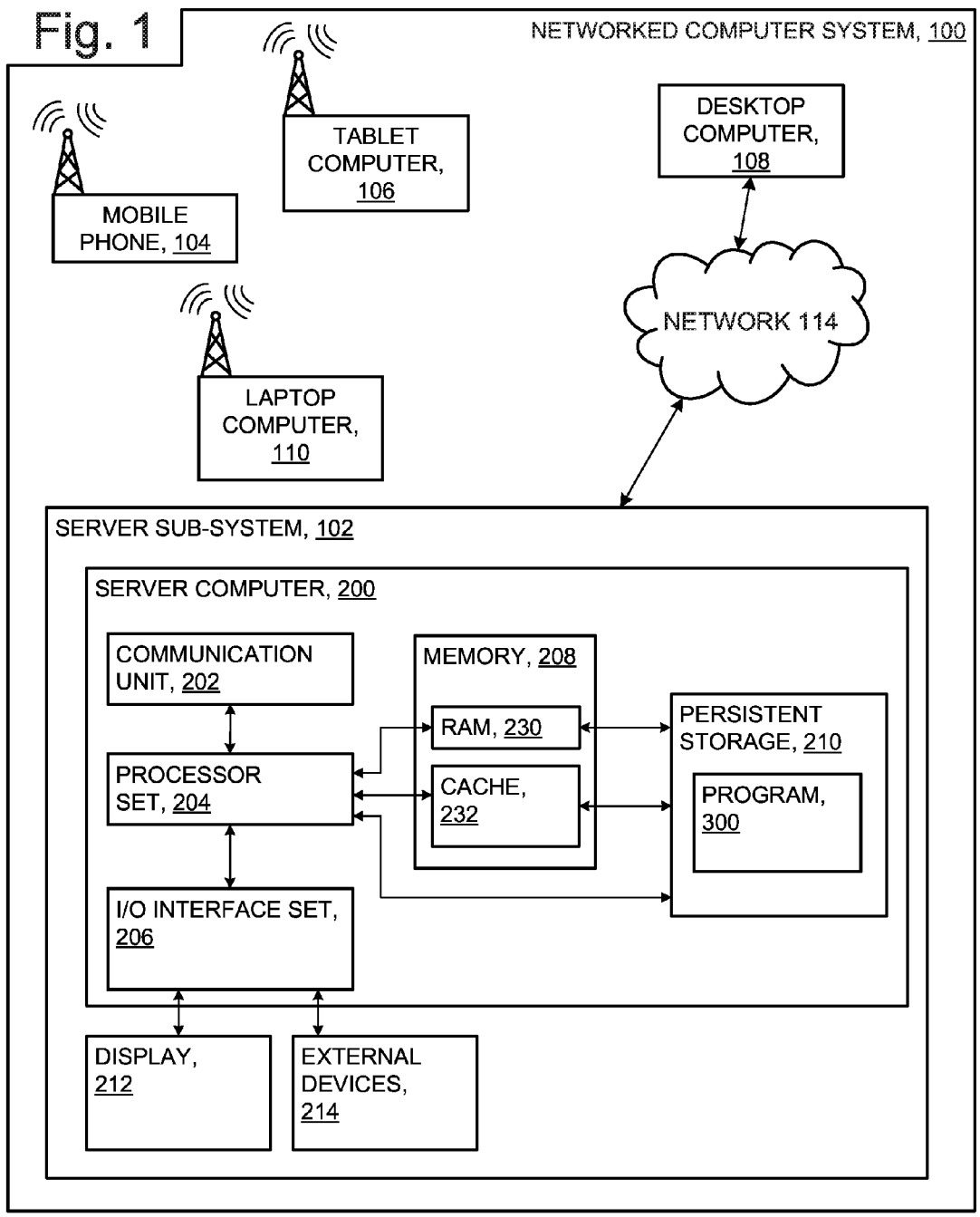
FIG. 1 is a block diagram view of a first embodiment of a system according to the present invention.

In some embodiments of the present invention: (i) for a set of computer devices, used by a common user, it is determined which computer device the user is most actively using; and (ii) an operational mode of a "wireless service" (see definition, below) on one of the other computer devices (that is, a non-most-active computer device) is changed in its operational mode. For example, if a user has two smart phones and the user's first smart phone is determined to be more active than the second smart phone, then on the second smart phone (that is, the non-most-active computer device) a social media home page updating service is turned off. In some embodiments, the change from first operational mode to second operational mode will mean that wireless transceiver hardware (such as an antenna) is turned off for the non-most-active device(s). In some embodiments, the change from first operational mode to second operational mode will mean that the wireless transceiver hardware stays turned on, but that fewer (or more) wireless communications are sent through the wireless transceiver hardware.

This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of networked computers system 100, including: server sub-system 102; wireless mobile phone 104; wireless tablet computer 106; desktop computer 108; wireless laptop computer 110; communication network 114; server computer 200; communication unit 202; processor set 204; input/output (I/O) interface set 206; memory device 208; persistent storage device 210; display device 212; external devices set 214; random access memory (RAM) devices 230; cache memory device 232; and program 300. It is noted that: (i) wireless mobile phone 104, wireless tablet computer 106, desktop computer 108 and wireless laptop computer 110 form a set of "computer devices" (see definition of "computer," below); and (ii) wireless mobile phone 104, wireless tablet computer 106, and wireless laptop computer 110 are all battery powered mobile devices (although desktop computer 108 is not).

Server sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage and control certain software functions that will be discussed in detail, below, in the Example Embodiment sub-section of this Detailed Description section.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
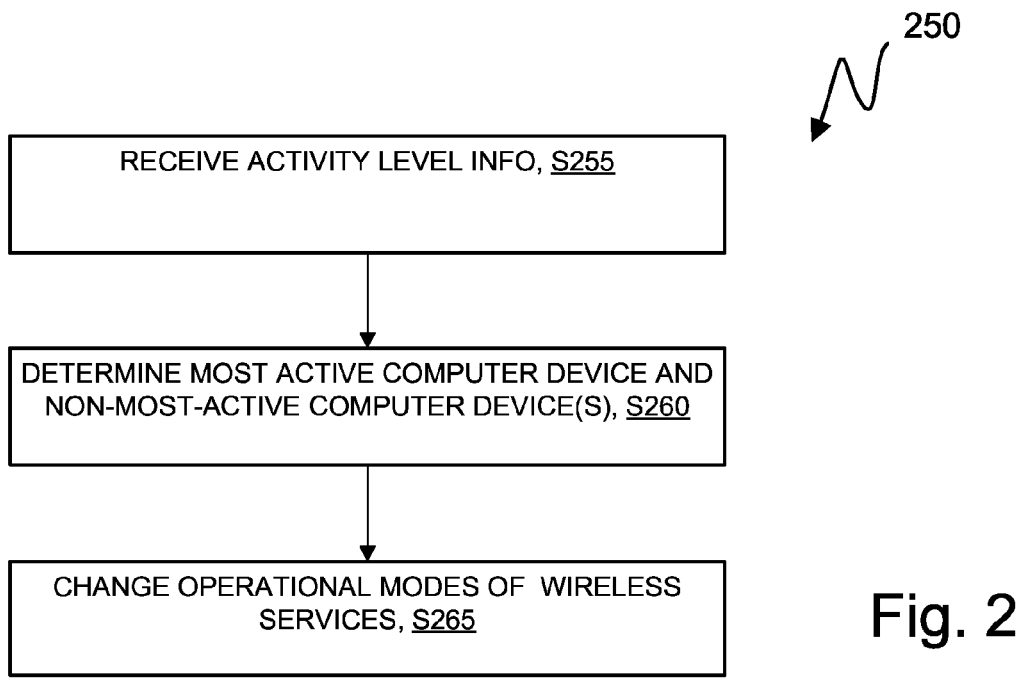
FIG. 2 is a flowchart showing a first embodiment method performed, at least in part, by the first embodiment system.
Figure 3:
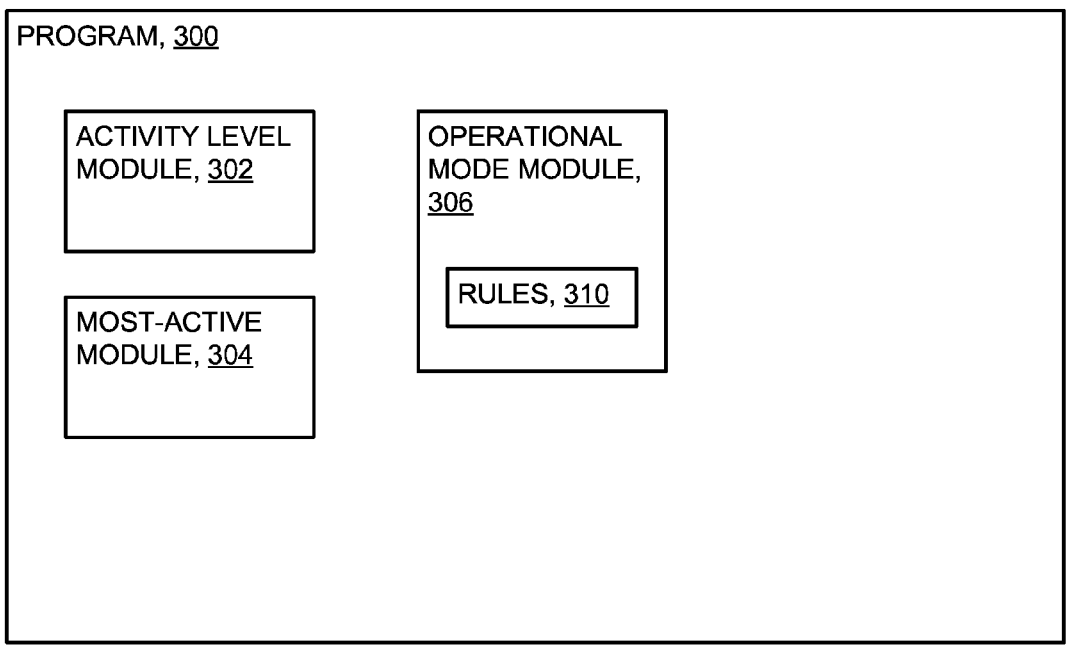
FIG. 3 is a block diagram showing a machine logic (for example, software) portion of the first embodiment system.

FIG. 2 shows flowchart 250 depicting a method according to the present invention. FIG. 3 shows program 300 for performing at least some of the method operations of flowchart 250. This method and associated software will now be discussed, over the course of the following paragraphs, with extensive reference to FIG. 2 (for the method operation blocks) and FIG. 3 (for the software blocks).

Processing begins at operation S255, where activity level module ("mod") 302 receives information relating to computer device activity level for a set of computer devices. In this example, the computer devices are mobile phone 104, tablet computer 106, desktop computer 108 and laptop computer 110, and all devices of the set have been designated as being devices used only by a single user. In this example, the activity level information is sent from each device in the computer device set, through network 114, to mod 302. In this example, the activity level information includes information such as: (i) whether the computer device is on or off; (ii) whether the computer device is sleeping or hibernating; (iii) how much time has elapsed since the user has provided user input to the respective computer device; (iv) the amount of discrete user inputs over the preceding 15 minutes; (v) a low battery condition; and/or (vi) any information indicative of computer device activity level now known or to be developed in the future.

Processing proceed to operation S260, where most-active mod 304 determines, based on the activity level information previously received at operation S255, as follows: (i) the most active device in the set of devices 104, 106, 108, 110; and (ii) the non-most-active-devices in the set of devices 104, 106, 108, 110. In this embodiment the machine logic rules (not separately shown) of mod 304 are written so that only a single device can be most-active, and all of the other computer devices of the set are designated as non-most-active. Alternatively, in some embodiments, more than one computer device may be selected for most-active status.

Processing proceeds to operation S265, where operational mode mod 306 adjusts operational modes of wireless services of the non-most-active devices of computer device set 104, 106, 108, 110. More specifically: (i) machine logic based rules 310 of mod 306 determine whether and how to adjust the various wireless services running on the non-most active devices; and (ii) appropriate commands are sent, through network 114, in order to effect the changes in each non-most-active device. As a simple example, the wireless antenna of a non-most active device may be changed from a first operation mode of "on" to a second operational mode of off. In this example, it is transceiver hardware that is changed in operational mode. In other examples, the change in operational mode will be limited to a change in how software operates (for example, changing from a first operational mode where an email type wireless service updates every ten (10) seconds to a second operational mode where the email type wireless service updates every ten (10) minutes). The Further Comments And/Or Embodiments sub-section, below, has further examples of specific ways to change operational modes of wireless services.

Often, the change in operational mode will cause there to be fewer (or no) wireless communications to/from the non-most active device, which can save energy (which is especially helpful in mobile, battery powered computer devices). Alternatively, the operational change may cause additional wireless communications and/or communication related energy consumption. For example, a large media upload being performed by an internet service type of wireless service may be controlled to proceed at a higher data transfer rate when the associated device is one of the non-most-active devices.

Some different types of wireless services include the following: a near field communications (NFC) type wireless service; a wireless telephone service; other telephony services; an internet service; any wireless local area network (WLAN) type service based on the Institute of Electrical and Electronics Engineers (IEEE) 802.11 standards (as of Jul. 27, 2015); a global positioning system (GPS) type service; an AM (amplitude modulated) type radio service; an FM (frequency modulated) type radio service; and broadcast television. Some "wireless services" merely control transceiver hardware—these are typically changed in operational mode by turning the transceiver hardware between on, off and/or sleep modes. Other "wireless services" (for example, internet services) do not relate much to transceiver hardware, but rather cause, control and/or facilitate wireless communications being made from and/or to the computer device.

III. Further Comments and/or Embodiments

Some embodiments of the present invention recognize the following facts, potential problems and/or potential areas for improvement with respect to the current state of the art: (i) typically, when a single individual person runs internet services on multiple devices belonging to him, there are unneeded, redundant data transfers; (ii) the redundant data transfers referred to in the previous item cause unnecessary mobile ISU device battery drain, unnecessarily decrease the serviceable lifetime of a battery charge and can decrease the length of battery life due to a higher rate of battery charge/discharge cycling; (iii) existing apps or solutions do not necessarily consider maximizing battery life, nor do they minimize battery drain while providing access to internet services; (iv) there is even greater impact under conditions where a mobile device has a very low energy storage capacity battery; (v) solutions to the foregoing items that require an individual person to manually shut off internet services on mobile devices not being used require the individual person to take the time and attention required to manually switch off internet services on mobile devices that are not currently being used; (vi) conventional solutions lack intelligent methods to access internet services from a mobile device when there are alternate ways available to access "internet services" (see definition, below, in the Definitions sub-section of this Detailed Description section); and/or (vii) conventional solutions lack intelligent methods to provide efficient battery use among and between multiple ISU devices being used by a single individual person (for example, being used in series by a single individual over time).

Some embodiments of the present invention may include one, or more, of the following features, characteristics and/or advantages: (i) users access a mobile application's metadata (notifications snapshot) through an alternative device (for example a laptop or desktop computer) where the metadata allows the user to quickly understand the nature and/or importance of the underlying data without looking at the data; (ii) automatically and/or selectively enables internet service on the mobile device, based on the nature and/or importance of the data; (iii) pushes notifications to a user's private cloud account as well, so that the notifications can be accessed from any of the user's internet enabled devices; (iv) selectively disables or enables wireless service on a mobile device; (v) efficiently uses the mobile device's battery thereby extending the battery life; and/or (vi) implements a power saving application or feature, for example as part of a mobile device operating system (OS).

Some embodiments of the present invention may further include one, or more, of the following features, characteristics and/or advantages: (i) using a special option on the mobile device, power saving mode on the mobile device can be enabled by avoiding redundant access of internet from multiple devices; (ii) using a special option on the mobile device, a user will get access only to notifications and retrieving the actual data is disabled; (iii) dynamically enabling internet access on a mobile device based on private cloud login information; (iv) dynamically enabling internet access on a mobile device based on the battery strength of the device through which the cloud account is being currently logged in; (v) pushing notifications to the cloud and showing notifications according to the criticality of associated messages; (vi) tagging each notification with criticality, date, time and origin; (vii) giving a user a unique id which is used by an application server to push notifications to user's private cloud; and/or (viii) giving a user an option, in the mobile device, to selectively enable pushing notifications to the cloud for each app.

In some embodiments of the present invention, the presence of another battery powered device belonging to a user can be detected by the user's cloud account, based on recent logged-in status. The user's cloud account has a list of notifications from each application running on the mobile device. Notifications apply to various applications including, but not limited to, for example: emails, text messaging, game scores, voice over IP (VOIP) calls, social networking updates, and/or rich site summary (RSS) feeds. Notifications help a user to get a quick glance at the latest happenings in their mobile personal data. Access to notifications or metadata of mobile personal data helps the user to take appropriate actions in response.

Some embodiments of the present invention may include one, or more, of the following features, characteristics and/or advantages: (i) applications send push notifications to the user's private cloud account in addition to the mobile application server (such as a social networking server); (ii) each push notification is relatively small when compared to the data associated with the notification; (iii) the user's cloud account is authenticated by username and password; and/or (iv) each notification is metadata associated with the actual data, including attributes (for example, criticality, origin, date and time). These attributes are explained in the following paragraphs:

Criticality attributes can be pre-defined by a user of a mobile device. Criticality is specific to each application on the mobile device. For example, in an email application in some embodiments of the present invention, a user can define emails from some senders as critical. Hence, if an email from a critical sender is received, it is prominently shown and/or highlighted in the notification list.

Origin is a name of a place or sender from where or whom the message originated. For example, in some embodiments of the present invention, if an email is received from a known originator, the origin is the originator's name. Alternatively, if a phone call from an unknown number is missed, the origin may be the location, or some other aspect associated with the caller.

Date and time, in some embodiments of the present invention, indicate when a message was sent. Alternatively, date and time may indicate when the message was received.

In some embodiments of the present invention, notifications are sorted according to criticality, origin, and/or date and time. Since the notifications are in the cloud, they can be accessed from any device with internet access. A user responds to any notification as they choose. Responses can involve, for example, placing a telephone call, sending an email message, browsing a particular multimedia web page, accessing a particular web application, sending an instant message, etc.

Further power-saving modes implemented by a mobile device OS, in some embodiments of the present invention include "notification-only mode" and "single-device mode". In notification-only mode, the mobile device OS displays only notifications, and does not receive the actual data when, for example, its corresponding notification is selected for viewing. Notification-only mode is useful, for example, in low-battery conditions. In single-device mode, if a mobile device determines that its user's cloud account is logged in from another device, internet services are automatically disabled on the mobile device.

In some embodiments of the present invention: (i) a user's cloud account receives notifications from applications to which the user has subscribed or has installed in one or more devices; (ii) the user signs in to the cloud account using a first device, (mobile or otherwise); (iii) an application or the operating system (OS) on a second (mobile) device detects that the user is logged into the cloud account from a first device; (iv) the second device enters a power saving mode by, for example, switching off its wireless services; (v) the second mobile device powers off other application(s) and/or makes them run only on the cloud account; (vi) metadata (or notifications) that each application sends is displayed on the first device; (vii) the user takes appropriate actions by assessing the importance of the metadata, (where possible actions include manually enabling wireless service on the first or second device to access the actual data); and/or (viii) if the user locks or shuts down the second mobile device, the second mobile device may have an application or feature which continues to ping the cloud account whereupon after detecting that the cloud account is no longer being accessed from the first device, enables wireless service on the second mobile device (to operate in the regular mode).

In some embodiments of the present invention, software running on a first device communicates to a second device that the first device is no longer accessing the cloud account. The first device OS checks whether it can enable the internet service on the second device. The second device OS enables the wireless service and checks whether the cloud account is being accessed from any other device belonging to the user. If the user's cloud account is being accessed from another device belonging to the user, the second device switches off its wireless services. If the cloud account is not being accessed from another device belonging to the user, the second device keeps its wireless services running. If the user again logs in to the cloud account using the first device, the second device is notified and enables its power saving mode which includes switching off its wireless services.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

User/subscriber: includes, but is not necessarily limited to, the following: (i) a single individual human; (ii) an artificial intelligence entity with sufficient intelligence to act as a user or subscriber; and/or (iii) a group of related users or subscribers.

Data communication: any sort of data communication scheme now known or to be developed in the future, including wireless communication, wired communication and communication routes that have wireless and wired portions; data communication is not necessarily limited to: (i) direct data communication; (ii) indirect data communication; and/or (iii) data communication where the format, packetization status, medium, encryption status and/or protocol remains constant over the entire course of the data communication.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer and computer device: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

Internet service: any set of machine logic (for example, a software program) running on a computer device that communicates with remote computer device(s) through the internet.

Wireless service: any hardware and/or software that makes, facilitates and/or controls wireless communications made by a computer device.

What is claimed is:

1. A method for use with a first computer device of a first user and a second computer device of the first user, the method comprising:

running a wireless service on the first computer device;

receiving, by the wireless service, first battery level information including information indicating a low battery condition of the first computer device;

receiving, by the wireless service, second battery level information including information indicating that the second computer device is not in a low battery condition; and sending, by the wireless service, a command to switch the wireless service from running on the first computer device to running on the second computer device based upon the first battery level information and the second battery level information;

wherein:

the first battery level information is different than the second battery level information;

the first battery level information and the second battery level information relate to two different batteries.

2. The method of claim 1 wherein:

the first computer device is a battery powered mobile device; and the second computer device is a battery powered mobile device.

3. The method of claim 1, wherein the switch of the wireless service from running on the first computer device to running the second computer device causes a reduction in a number of wireless communications between the first computer device and the wireless service, thereby preserving battery life of the first computer device while it is in low battery condition.

4. The method of claim 1, wherein:

the wireless service is an internet service; and the internet service includes at least one of the following types of internet services: email, rich site summary (RSS) feeds, social networking updates, texting applications that use internet connections, instant messaging service, internet telephony applications, internet provider services, internet based media editing, web browsing, and/or multimedia uploading or downloading.

5. The method of claim 1 wherein the switching of the wireless service from running on the first computer device to the second computer device includes shutting off wireless transceiver hardware of the first computer device.

6. The method of claim 1 wherein the wireless service is a cloud account of the first user.

* * * * *